(12) United States Patent
Hung

(10) Patent No.: US 7,534,183 B2
(45) Date of Patent: May 19, 2009

(54) CONVEYING DEVICE FOR ADJUSTING SCANNING RESOLUTION

(75) Inventor: Yi-Chuan Hung, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 436 days.

(21) Appl. No.: 11/555,116

(22) Filed: Oct. 31, 2006

(65) Prior Publication Data

US 2008/0101820 A1    May 1, 2008

(51) Int. Cl.
    *F16H 3/72* (2006.01)
(52) U.S. Cl. .......................................................... 475/5
(58) Field of Classification Search .................... 475/5, 475/14, 151
    See application file for complete search history.

(56) References Cited

U.S. PATENT DOCUMENTS

| | | | | | |
|---|---|---|---|---|---|
| 3,872,738 | A | * | 3/1975 | Price et al. | 475/5 |
| 4,233,858 | A | * | 11/1980 | Rowlett | 475/5 |
| 5,309,778 | A | * | 5/1994 | Antonov | 74/15.86 |
| 6,461,265 | B1 | * | 10/2002 | Graham et al. | 475/5 |
| 7,044,877 | B2 | * | 5/2006 | Ai | 475/5 |

* cited by examiner

*Primary Examiner*—Dirk Wright
(74) *Attorney, Agent, or Firm*—WPAT, P.C.; Anthony King

(57) ABSTRACT

A conveying device for adjusting scanning resolution includes a planetary gear transmission a belt and a scanning device. The planetary gear transmission has a base, a first stepping motor and a second stepping motor. A first motor gear drives a sun gear. A second motor gear drives a purl gear. Four planetary gears are received in a hole of the purl gear. The planetary gears are driven by the inner gear and the upper gear at the same time, so the planetary gears rotate around a positioning axle of the sun gear at a speed of half the speed difference of the inner gear and the upper gear. Then a planetary frame rotates along with the planetary gears. A belt wheel mounted on the planetary frame drives the belt with a scanning device to move.

6 Claims, 5 Drawing Sheets

CONVEYING DEVICE FOR ADJUSTING SCANNING RESOLUTION

BACKGROUND OF THE INVENTION

1. Field of the Invention

The present invention relates to a conveying device for a scanning module, and more particularly to a conveying device having a planetary gear transmission to adjust the resolution (DPI, dots per inch) of a scanner.

2. The Related Art

In image scanning field, the quality of the image is required better, so the resolution (dots per inch) of the image is required higher and higher.

A conveying device includes a planetary gear transmission a belt and a scanning device. In order to improve the quality of the image, a spur gear and a speed-change chest are used in the gear transmission. The speed-change chest comprises a gear speed-change module, the gear speed-change module consists of a plurality of gears having different numbers of teeth. Different gear results in different resolution, so when a certain resolution is desired, a gear having proper teeth is chosen to clench the teeth of a belt gear, the belt gear drives the belt move, then the scanning device connected to the belt moves along with the belt to scan a document.

When a certain resolution is desired, a gear having proper teeth is chosen, however, the number of the gears is limited, as a result, the resolution is limited. Meanwhile, one stepping motor is used in the gear transmission to control the rotational speed. On one hand, when the motor rotates too slowly the motor shakes, so the quality of the scanning is not good, on the other hand, when the motor rotates too quickly the motor is unsteady and the resolution is not good yet. Moreover, the volume of the gear transmission is large and the structure is complex, as a result, the rotation is not stable and the quality of the image is not good.

SUMMARY OF THE INVENTION

Accordingly, an object of the present invention is to provide a conveying device for adjusting scanning resolution includes a planetary gear transmission a belt and a scanning device. The planetary gear transmission comprising a base, a first stepping motor and a second stepping motor mounted on the bottom of the base the first stepping motor includes a first motor shaft and a first motor gear positioned around the first motor shaft, the second stepping motor includes a second motor shaft and a second motor gear positioned around the second motor shaft, the first motor gear clenches the teeth of an idle gear, the idle gear clenches the teeth of a sun gear, a positioning axle with a positioning hole is placed in the center of the sun gear, a partition sleeves the sun gear, the sun gear defines an upper gear above the partition and a lower gear below the partition, the lower gear clenches the teeth of the idle gear. A purl gear has a cylindrical hole in the center, an outer gear is formed on the outer side of the purl gear and an inner gear is formed on the inner side of the cylindrical hole, the purl gear is placed on the partition and takes the positioning axle as its axle center, the outer gear clenches the teeth of the second motor gear. A plurality of planetary gears placed in the hole of the purl gear and on the partition of the sun gear, a cylindrical receiving hole is formed in each planetary gear. The planetary gears clench the teeth of the upper gear of the sun gear and the teeth of the inner gear of the purl gear at the same time. A planetary frame has a turntable, the bottom of the turntable protuberates downward and is vertical to the turntable to define a plurality of planetary shafts, and each planetary shaft is received in the receiving hole of the planetary gear respectively. A belt wheel mounted on the upper surface of the turntable, a shaft hole is defined in the belt wheel and opened through the belt wheel and the turntable. The turntable covers the hole of the purl gear. The belt sleeves the belt wheel and moves along with the belt wheel, the scanning device is connected to the belt and moves along with the belt to scan a document.

The first steeping motor drives the first motor shaft to rotate. In this case, the first motor shaft will drive the first motor gear to rotate in direction D1. Meanwhile, the first motor gear drives the idle gear rotate in the direction D1 too. The idle gear drives the sun gear rotate in the direction D1. The second stepping motor is started and drives the second motor shaft rotate, the second motor shaft drives the second stepping motor gear rotate in the direction D1, then the second stepping motor gear drives the purl gear rotate in the direction D2 opposed to the direction D1. The purl gear and the sun gear drive the planetary gear at the same time. The inner gear of the purl gear and the upper gear of the sun gear rotate in different linear velocities V1 and V2 (suppose V1>V2), so the planetary gear both rotates around its own axle and rotates around the positioning axle at the speed of ½(V1-V2). As the planetary shaft of the planetary frame received in the receiving hole of the planetary gear, the planetary frame rotates around the positioning axle along with the planetary gears. As a result, the belt wheel moves along with the planetary frame and then drives the belt to move, so the scanning device connected to the belt moves at the same speed as the belt to scan a document. Obviously, the planetary frame rotates in different speeds by adjusting the rotation speed of the two stepping motor, so the belt wheel rotates in different speeds and drives the belt moves in different speeds, accordingly, the resolution (dots per inch) of the image is different.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
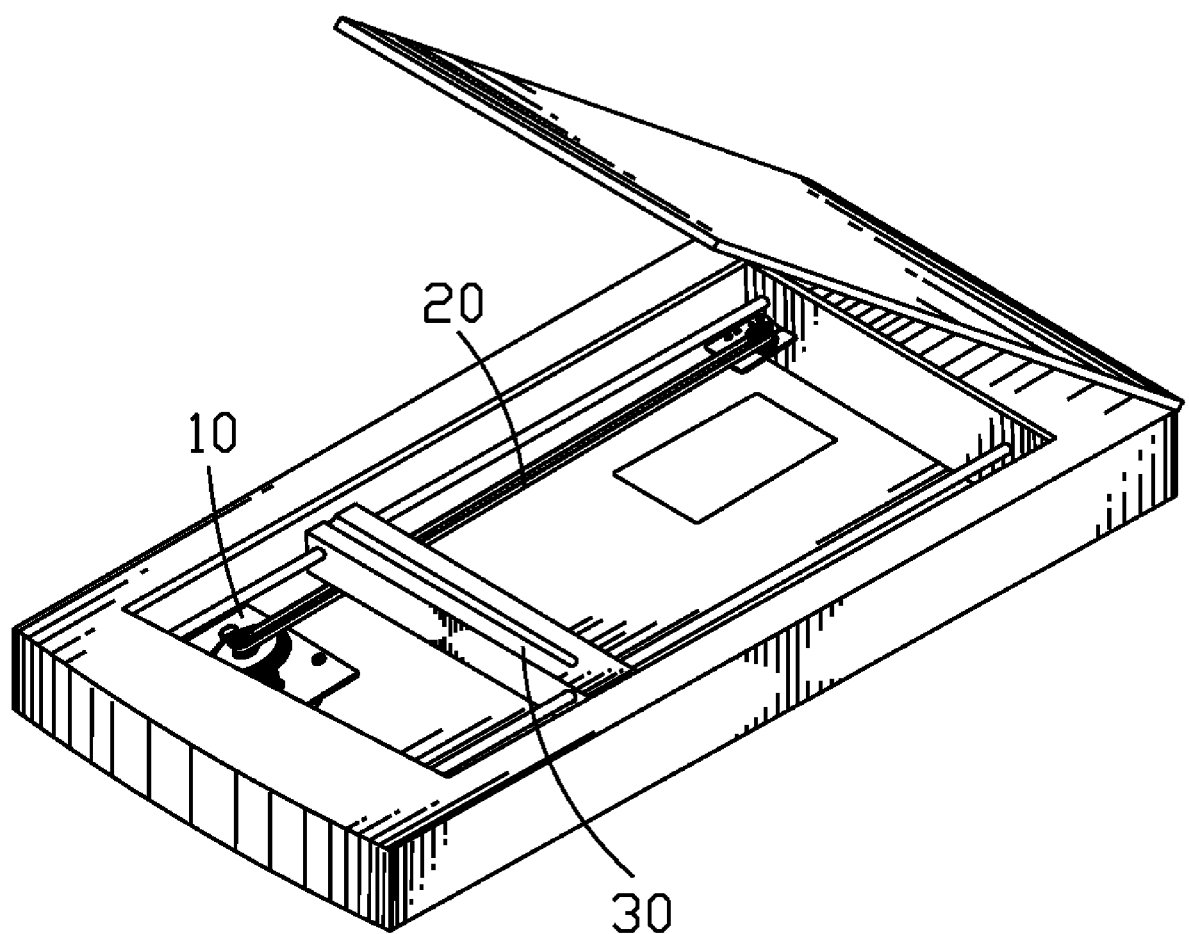
FIG. 1 is a perspective assembled view of a conveying device for adjusting scanning resolution of the present invention.
Figure 2:
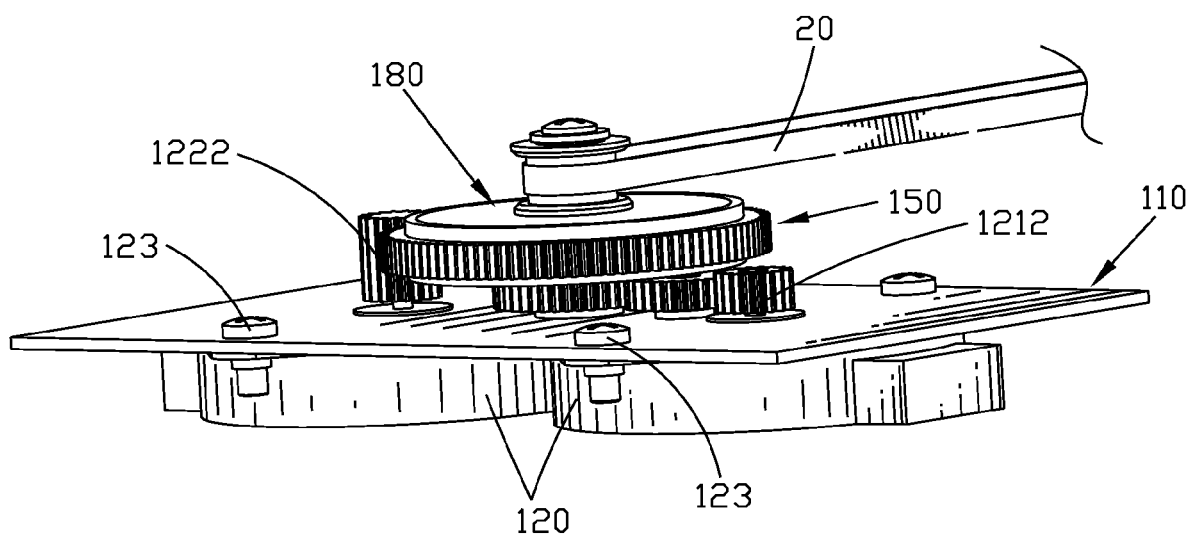
FIG. 2 is a perspective assembled view of a planetary gear transmission of the present invention shown in FIG. 1.
Figure 3:
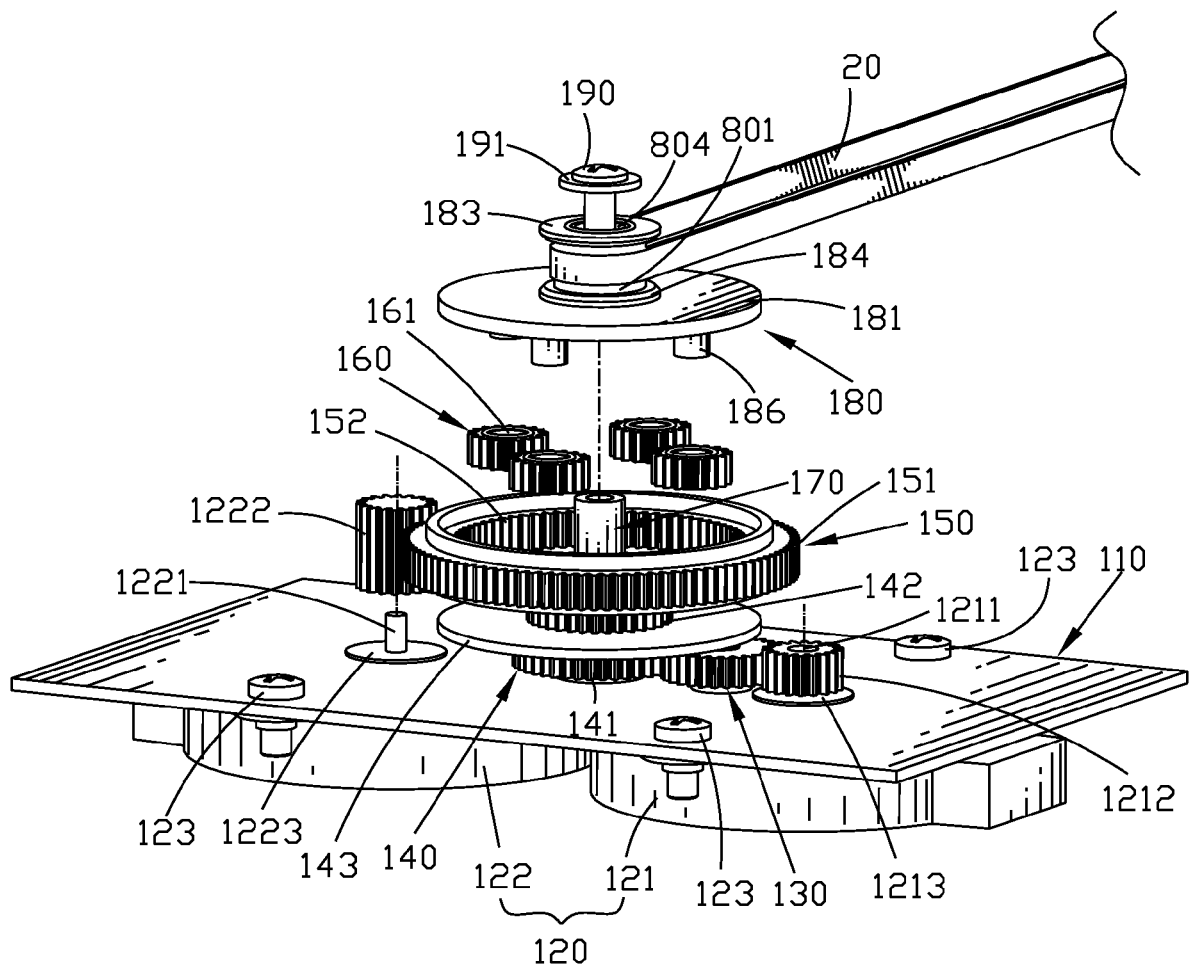
FIG. 3 is an exploded view of the planetary gear transmission.

Please refer to FIG. 1. A conveying device for adjusting scanning resolution of the present invention includes a planetary gear transmission 10 a belt 20 and a scanning device 30. As shown in FIGS. 2 and 3, the planetary gear transmission 10 includes a base 110, a first stepping motor 121 and a second stepping motor 122. The first stepping motor 121 and the second stepping motor 122 are positioned at the bottom of the base 110 through four base screws 123.

The first stepping motor 121 is provided with a first motor shaft 1211, the first motor shaft 1211 protuberates upward and passes through the base 110. A round first pillow 1213 is placed on the upper surface of the base 110 and sleeves the first motor shaft 1211. A first motor gear 1212 is positioned around the first motor shaft 1211, the first motor gear 1212 clenches the teeth of an idle gear 130, the idle gear 130 clenches the teeth of a sun gear 140. A positioning axle 170 with a positioning hole 171 is placed in the center of the sun gear 140. A partition 143 sleeves the sun gear 140. The sun gear 140 has an upper gear 142 above the partition 143 and a lower gear 141 below the partition 143. The lower gear 141 clenches the teeth of the idle gear 130. The second stepping motor 122 is provided with a second motor shaft 1221, the second motor shaft 1221 protuberates upward and passes through the base 110, a round second pillow 1223 is placed on the upper surface of the base 110 and sleeves the second motor shaft 1221. A second motor gear 1222 is positioned around the second motor shaft 1221. A purl gear 150 is provided with a cylindrical hole 153 formed in the center of the purl gear 150. An outer gear 151 is formed on the outer side of the purl gear 150 and an inner gear 152 is formed on the inner side of the cylindrical hole, the purl gear 150 is placed on the partition 143 and takes the positioning axle 170 as its axle center. The second motor gear 1222 clenches the teeth of the outer gear 151. Four planetary gears 160 are provided, a cylindrical receiving hole 161 is formed in each planetary gear 160. The four planetary gears 160 are placed in the hole 153 and on the partition 143. The planetary gears clench the teeth of the upper gear 142 and the teeth of the inner gear 152 at the same time.

Referring to FIG. 3 again, a planetary frame 180 includes a turntable 181, the bottom of the turntable 181 protuberates downward to define four planetary shafts 186 vertical to the turntable 181 with equidistance to each other. Each planetary shaft 186 is received in the receiving hole 161 respectively. A belt wheel 182 is mounted on the upper surface of the turntable 181. A belt 20 sleeves the belt wheel 182. A first restricting board 183 is mounted on the top surface of the belt wheel 81 and a second restricting board 184 is mounted on the bottom surface of the belt wheel 182 for keeping the belt 20 from falling off the belt wheel 182. A shaft hole 185 is defined in the belt wheel 182 and opened through the turntable 181. A screw 190 is provided, a pad 191 sleeves the screw 190 and is placed between the nut and the first restricting board 183, the screw 190 passes through the shaft hole 185 and is inserted into the positioning hole 171 of the positioning axle 170 and then fixed in the positioning axle 170, then the turntable 181 covers the hole 153 of the purl gear 150 (shown in FIG. 2). A scanning device 30 (shown in FIG. 1) connected to the belt 20 moves along with the belt 20 to scan a document.

Figure 4:
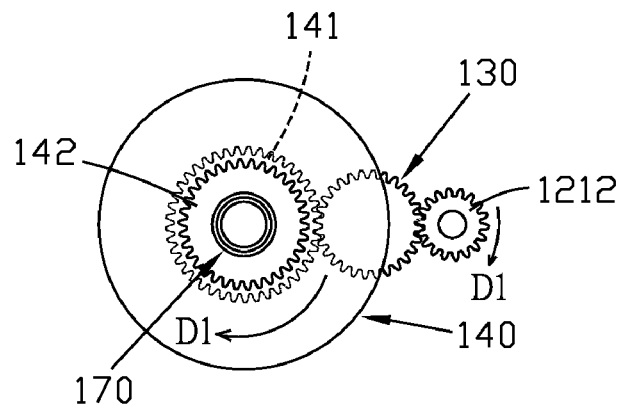
FIG. 4 is a vertical view showing the sun gear, the idle gear and the first motor gear when the first motor gear is rotating along direction D1.

Please refer to FIG. 4. The first motor gear 1212 is mounted on the first motor shaft 1211, further rotated by the first stepping motor 121 along the direction D1. Meanwhile, the first motor gear 1212 drives the idle gear 130 to rotate in direction D2 opposed to the direction D1. The idle gear 130 drives the sun gear 140 to rotate in the direction D1, and the upper gear 142 also rotate in the direction D1.

Figure 5:
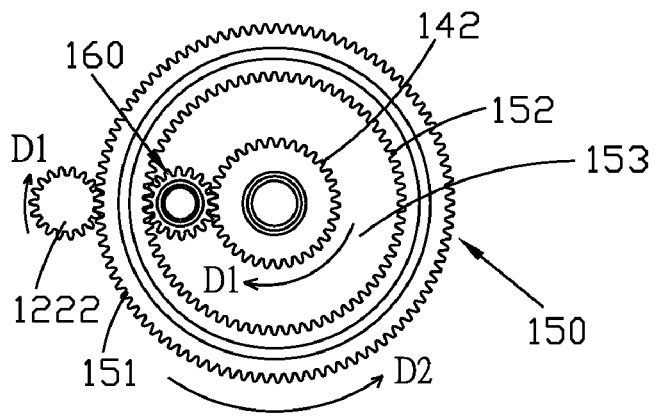
FIG. 5 is a vertical view of the sun gear, the planetary gear, the spur gear and the second motor gear when the second motor gear rotates opposed to the direction D1.
Figure 6:
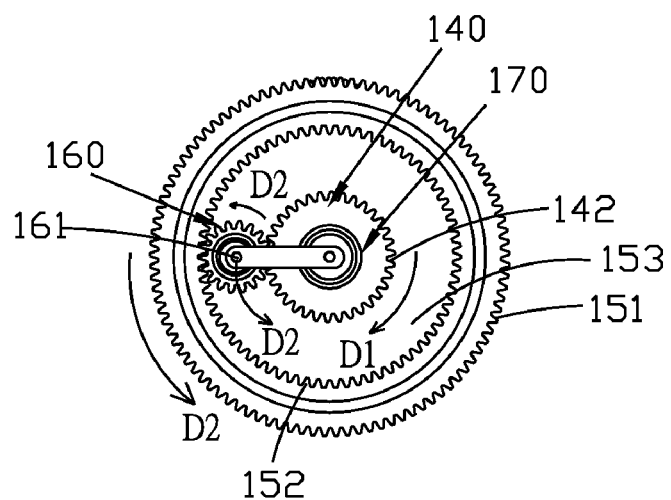
FIG. 6 is a vertical view of the sun gear, the planetary gear and the spur gear when the second motor gear rotates along the direction D1

Referring to FIGS. 5 and 6, the second motor gear 1222 clenches the teeth of the outer gear 151 of the purl gear 150, the inner gear 152 clenches the teeth of the planetary gear 160. When the second stepping motor gear 1222 is rotated by the second stepping motor 122 along the direction D1, then the second stepping motor gear 1222 drives the purl gear 150 to rotate in the direction D2 opposed to the direction D1. The inner gear 152 of the purl gear 150 and the upper gear 142 of the sun gear 140 rotate in different linear velocities V1 and V2 (suppose V1>V2), the purl gear 150 and the sun gear 140 drive the planetary gear 160 at the same time, so the planetary gear 160 both rotates around its own axle along the direction D2 and rotates around the positioning axle 170 along the direction D2 at the speed of ½(V1-V2). As the planetary shaft 186 of the planetary frame 180 received in the receiving hole 161 of the planetary gear 160, the planetary frame 180 rotates along with the planetary gears 160 in the direction D2. As a result, the belt wheel 182 moves along with the planetary frame 180 and then drives the belt 20 to move, so the scanning device 30 connected to the belt 20 moves at the same speed as the belt 20 to scan a document.

Figure 7:
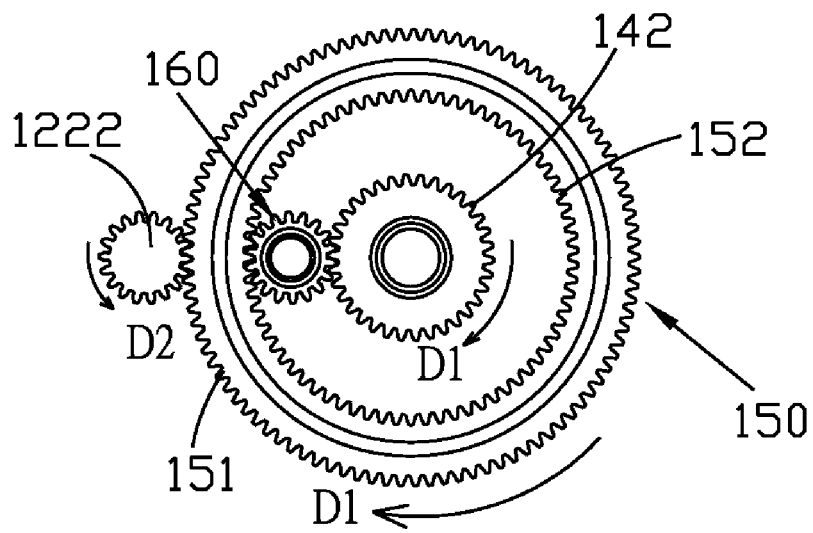
FIG. 7 is a vertical view of the sun gear, the planetary gear, the spur gear and the second motor gear when the second motor gear rotates along the direction D1.
Figure 8:
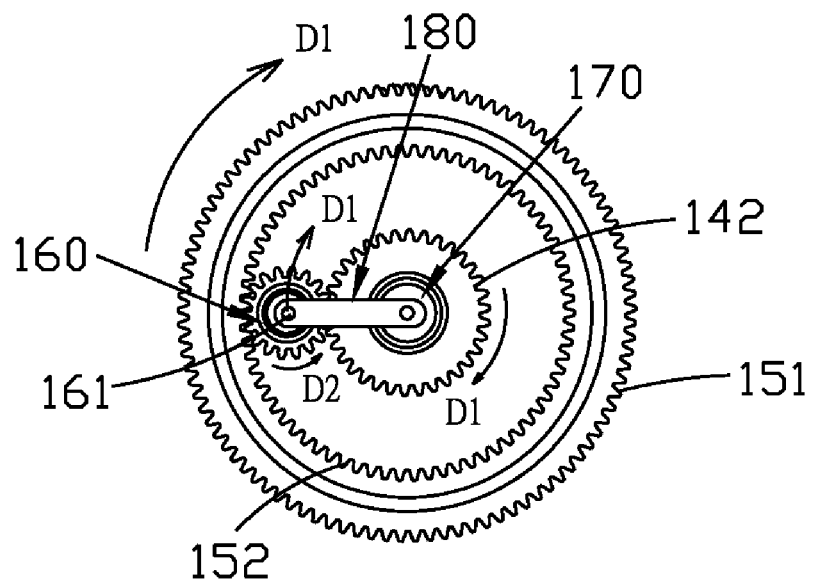
FIG. 8 is a vertical view of the sun gear, the planetary gear, the spur gear and the second motor gear when the second motor gear rotates opposed to the direction D1.

Referring to FIGS. 7 and 8, when the second stepping motor gear 1222 is rotated by the second stepping motor 122 along the direction D2 opposed to the direction D1, then the second stepping motor gear 1222 drives the purl gear 150 to rotate in the direction D1. The inner gear 152 of the purl gear 150 and the upper gear 142 of the sun gear 140 rotate in different linear velocities V1 and V2 (suppose V1>V2), the purl gear 150 and the sun gear 140 drive the planetary gear 160 at the same time, so the planetary gear 160 both rotates around its own axle along the direction D2 and rotates around the positioning axle 170 along the direction D1 at the speed of ½(V1-V2). As the planetary shaft 186 of the planetary frame 180 received in the receiving hole 161 of the planetary gear 160, the planetary frame 180 rotates along with the planetary gears 160 in the direction D1. As a result, the belt wheel 182 moves along with the planetary frame 180 and then drives the belt 20 to move, so the scanning device 30 connected to the belt 20 moves at the same speed as the belt 20 to scan a document.

As described above, the planetary gear transmission 10 of the present invention is provided with two stepping motors 121, 122, the planetary frame 180 rotates in different speed by adjusting the rotation speed of the two stepping motors 121, 122, so the belt wheel 182 rotates at different speeds and drives the belt 20 to move in different speed, as a result, the resolution (dots per inch) of the image is different. Moreover, the volume of the planetary gear transmission 1 of the present invention is smaller than the conventional gear transmission.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A conveying device for adjusting scanning resolution comprising:

a planetary gear transmission having
- a base,
- a first stepping motor and a second stepping motor mounted on the bottom of the base, the first stepping motor including a first motor shaft and a first motor gear positioned around the first motor shaft, the second stepping motor including a second motor shaft and a second motor gear positioned around the second motor shaft, both the first motor shaft and the second motor shaft protuberating upwards and passing through the base, the first motor gear clenching the teeth of
- an idle gear, the idle gear clenching the teeth of
- a sun gear, a positioning axle being placed in the center of the sun gear, a partition sleeving the sun gear, the sun gear defining an upper gear above the partition and a lower gear below the partition, the lower gear clenching the teeth of the idle gear,
- a purl gear having a cylindrical hole in the center, an outer gear being formed on the outer side of the purl gear and an inner gear being formed on the inner side of the cylindrical hole, the purl gear being placed on the partition and taking the positioning axle as its axle center, the outer gear clenching the teeth of the second motor gear,
- at least one planetary gear placed in the hole of the purl gear and on the partition of the sun gear, a cylindrical receiving hole being formed in each planetary gear, the planetary gear clenching the teeth of the upper gear of the sun gear and the teeth of the inner gear of the purl gear at the same time,
- a planetary frame having
  - a turntable, the bottom of the turntable protuberating downward and being vertical to the turntable to define
  - a plurality of planetary shafts, each planetary shaft being received in the receiving hole of the planetary gear respectively, then the turntable covering the hole of the purl gear, and
- a belt wheel mounted on the upper surface of the turntable, a shaft hole being defined in the belt wheel and opened through the belt wheel and the turntable;

a belt sleeving the belt wheel and moving along with the belt wheel; and a scanning device conveyed by the belt.

2. The conveying device for adjusting scanning resolution as claimed in claim 1, wherein a positioning hole is defined in the top surface of the positioning axle, a screw passes through the shaft hole and is inserted into the positioning hole, then the planetary frame is fixed in the positioning axle.

3. The conveying device for adjusting scanning resolution as claimed in claim 1, wherein the number of the plurality of planetary gears is four, accordingly, the number of the plurality of planetary shafts is four for being received in the receiving hole of the planetary gear respectively, the distances of the four planetary shafts are equal to each other.

4. The conveying device for adjusting scanning resolution as claimed in claim 3, further comprising a first restricting board placed on the top surface of the belt wheel and a second restricting board placed between the bottom surface of the belt wheel for keeping the belt from falling off the belt wheel.

5. The conveying device for adjusting scanning resolution as claimed in claim 1, further comprising a first pillow being placed on the upper surface of the base and sleeving the first motor shaft, a second pillow being placed on the upper surface of the base and sleeving the second motor shaft.

6. The conveying device for adjusting scanning resolution as claimed in claim 1, further comprising a plurality of base screws for positioning the first stepping motor and the second stepping motor on the base.

* * * * *